(12) United States Patent
Yang et al.

(10) Patent No.: US 12,429,635 B2
(45) Date of Patent: Sep. 30, 2025

(54) LENS ASSEMBLY

(71) Applicant: Samsung Electro-Mechanics Co., Ltd., Suwon-si (KR)

(72) Inventors: So Mi Yang, Suwon-si (KR); Jae Hyuk Huh, Suwon-si (KR); Byung Hyun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 478 days.

(21) Appl. No.: 17/974,142

(22) Filed: Oct. 26, 2022

(65) Prior Publication Data
US 2023/0408736 A1 Dec. 21, 2023

(30) Foreign Application Priority Data
Jun. 20, 2022 (KR) .................. 10-2022-0074659

(51) Int. Cl.
*G02B 5/00* (2006.01)
*G02B 7/02* (2021.01)

(52) U.S. Cl.
CPC ............. *G02B 5/005* (2013.01); *G02B 7/021* (2013.01)

(58) Field of Classification Search
None
See application file for complete search history.

(56) References Cited

U.S. PATENT DOCUMENTS

| | | | | |
|---|---|---|---|---|
| 7,850,319 | B2* | 12/2010 | Yoshikawa | G02B 1/11 359/614 |
| 9,400,383 | B2* | 7/2016 | Liang | G02B 27/0025 |
| 10,845,507 | B2 | 11/2020 | Chou et al. | |
| 2004/0223074 | A1* | 11/2004 | Takada | H04N 23/54 348/360 |
| 2016/0246027 | A1* | 8/2016 | Willis | G02B 7/02 |
| 2019/0041608 | A1* | 2/2019 | Chou | G02B 1/041 |
| 2019/0179098 | A1* | 6/2019 | Yang | G02B 7/021 |
| 2021/0302684 | A1* | 9/2021 | Yang | G02B 5/005 |
| 2021/0364731 | A1* | 11/2021 | Chang | G02B 13/0065 |
| 2022/0276459 | A1* | 9/2022 | Kim | G03B 17/12 |
| 2024/0219673 | A1* | 7/2024 | Yang | G02B 7/022 |

FOREIGN PATENT DOCUMENTS

| | | | |
|---|---|---|---|
| KR | 10-2020-0050919 A | 5/2020 | |
| KR | 10-2021-0119863 A | 10/2021 | |

* cited by examiner

*Primary Examiner* — Ryan Crockett
(74) *Attorney, Agent, or Firm* — NSIP Law

(57) ABSTRACT

A lens assembly includes a lens barrel, a plurality of lenses disposed in the lens barrel and sequentially arranged along an optical axis, and a spacer disposed between two adjacent lenses among the plurality of lenses and comprising a hole formed in the spacer in an optical axis direction, wherein an inner surface of the spacer surrounding the hole formed in the spacer includes first shapes protruding toward the optical axis, and second shapes protruding away from the optical axis, the first shapes and the second shapes alternate with each other one by one in a circumferential direction of the inner surface of the spacer, and a distance between vertices of two first shapes among the first shapes separated from each other by one second shape among the second shapes varies in the circumferential direction.

15 Claims, 4 Drawing Sheets

LENS ASSEMBLY

CROSS-REFERENCE TO RELATED APPLICATIONS

This application claims the benefit under 35 USC 119(a) of Korean Patent Application No. 10-2022-0074659 filed on Jun. 20, 2022, in the Korean Intellectual Property Office, the entire disclosure of which is incorporated herein by reference for all purposes.

BACKGROUND

1. Field

The present disclosure relates to a lens assembly.

2. Description of Related Art

Imaging apparatuses may include a lens barrel including a plurality of lenses to image a subject. In order to maintain a distance between the plurality of lenses, spacers may be disposed between the lenses.

Lenses and spacers used in optical zoom cameras are designed to have a non-circular shape to enable miniaturization of camera modules. For example, lenses and spacers may be designed to have a D-cut shape. This may cause an unintentional flare phenomenon to occur due to light diffraction and interference.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens assembly includes a lens barrel; a plurality of lenses disposed in the lens barrel and sequentially arranged along an optical axis; and a spacer disposed between two adjacent lenses among the plurality of lenses and including a hole formed in the spacer in an optical axis direction, wherein an inner surface of the spacer surrounding the hole formed in the spacer includes first shapes protruding toward the optical axis; and second shapes protruding away from the optical axis, the first shapes and the second shapes alternate with each other one by one in a circumferential direction of the inner surface of the spacer, and a distance between vertices of two first shapes among the first shapes separated from each other by one second shape among the second shapes varies in the circumferential direction.

The distance between the vertices of the two first shapes may have at least three different values in the circumferential direction.

An outer surface of the spacer may include two flat surfaces opposing each other and two curved surfaces opposing each other.

A distance between the two flat surfaces viewed in the optical axis direction may be less than a sum of radii of curvature of the two curved surfaces viewed in the optical axis direction.

A line connecting the vertices of the first shapes on each of two portions of the inner surface opposing each other may be a curve having a first radius of curvature, and a line connecting the vertices of the first shapes on each of two other portions of the inner surface opposing each other may be a curve having a second radius of curvature.

The first radius of curvature and the second radius of curvature may be different from each other.

Each of the first shapes may have a curved surface that is convex toward the optical axis.

Each of the second shapes may have a curved surface that is concave toward the optical axis.

Each first shape of the first shapes may protrude toward the optical axis from ends of two second shapes disposed on opposite sides of the first shape among the second shapes.

The distance between the vertices of the two first shapes may be 0.03 mm or more and 1.0 mm or less.

The first shapes and the second shapes may be connected to each other at inflection points, and a distance between adjacent inflection points among the inflection points may vary in the circumferential direction.

The inner surface of the spacer may include at least one first region in which the distance between the adjacent inflection points increases in the circumferential direction, and at least one second region in which the distance between the adjacent inflection points decreases in the circumferential direction.

The at least one first region and the at least one second region may alternate with each other one by one in the circumferential direction.

In another general aspect, a lens assembly includes a lens barrel; a plurality of lenses disposed in the lens barrel and sequentially arranged along an optical axis, each lens of the plurality of lenses having a first width in a first direction intersecting the optical axis and a second width in a second direction intersecting the optical axis and perpendicular to the first direction, the second width being different from the first width; and a spacer disposed between two adjacent lenses among the plurality of lenses and including a hole formed in the spacer in an optical axis direction, wherein an inner surface of the spacer surrounding the hole formed in the spacer includes a plurality of concave portions protruding away from the optical axis, d is a distance between adjacent points at which two concave portions meet, and two ds adjacent to each other are different from each other.

Each of the plurality of concave portions may have a curved surface that is concave toward the optical axis.

The plurality of concave portions may include V-shaped portions and C-shaped portions alternately arranged with each other one by one.

The spacer may be opaque.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
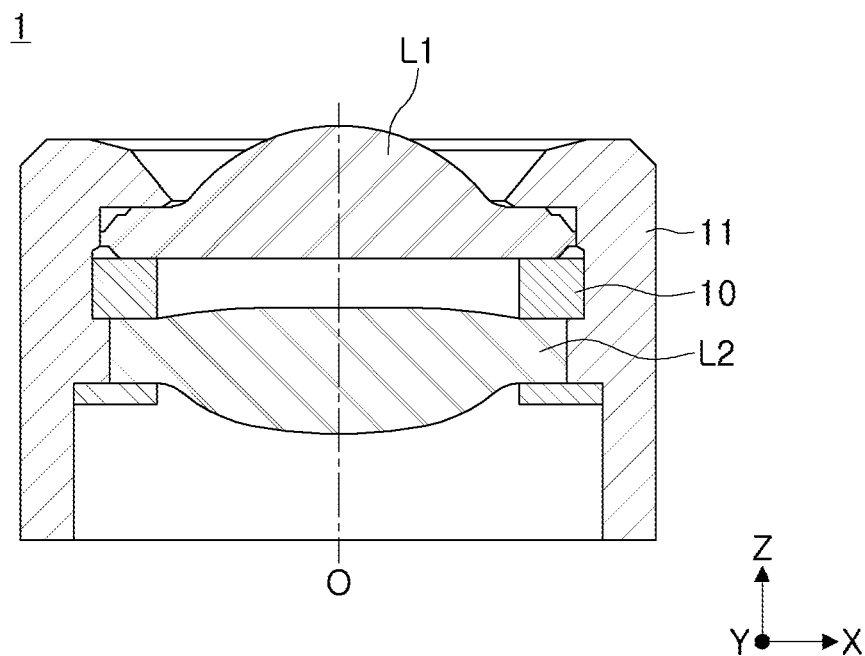
FIG. 1 is a cross-sectional view of a lens assembly according to an embodiment in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 2:
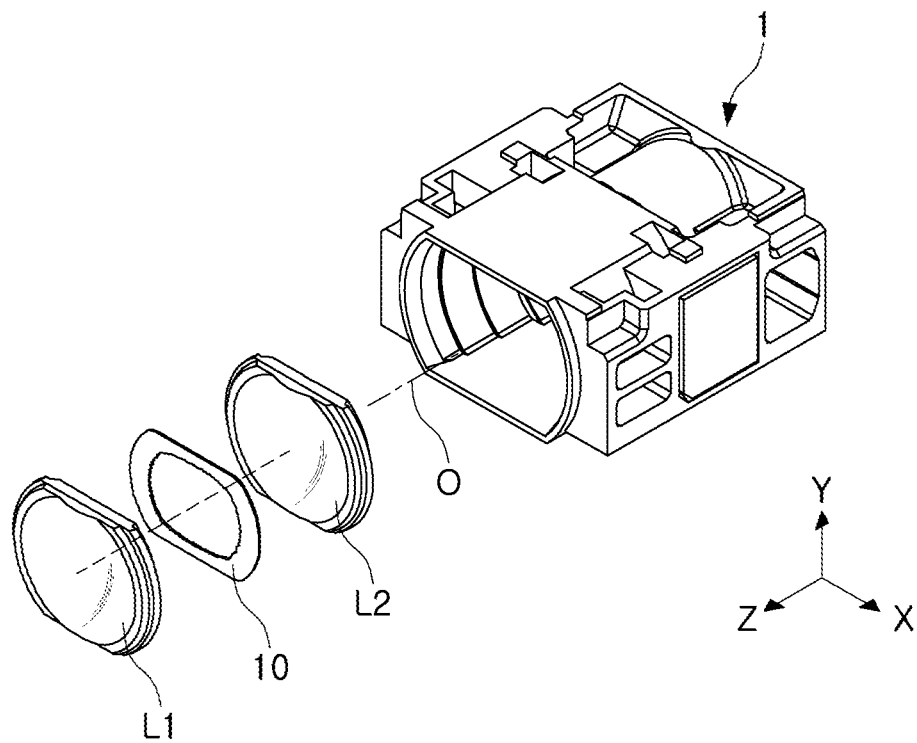
FIG. 2 is a perspective exploded view of the lens assembly of FIG. 1.

FIG. 1 is a cross-sectional view of a lens assembly according to an embodiment in the present disclosure, and FIG. 2 is a perspective exploded view of the lens assembly of FIG. 1.

Referring to FIGS. 1 and 2, a lens assembly 1 according to an embodiment in the present disclosure includes a lens barrel 11, a plurality of lenses disposed in the lens barrel 11, and a spacer 10. The plurality of lenses are sequentially arranged in the lens barrel 11 along an optical axis O. The plurality of lenses may include a first lens L1 positioned closest to an object, and a second lens L2 adjacent to the first lens L1.

The spacer 10 according to an embodiment in the present disclosure may have a hole in an optical axis O direction. That is, the hole in the spacer 10 is visible when the spacer 10 is viewed in the optical axis O direction. The spacer 10 is disposed between two adjacent lenses (e.g., the first lens L1 and the second lens L2) to maintain a distance between the lenses. That is, the spacer 10 may be at least partially in contact with each of the first lens L1 and the second lens L2 and may maintain a distance between the first lens L1 and the second lens L2 by a length of the spacer 10 in the optical axis O direction.

The spacer 10 may serve not only to maintain a distance between the lenses, but also to block unnecessary light from being incident on an image sensor. In this case, a thickness of the spacer 10 may be formed to be 0.01 mm or more and 0.1 mm or less. In addition, the spacer 10 may be made of an opaque material such as polyethylene terephthalate (PET) or metal. That is, the spacer 10 may be opaque.

Figure 3:
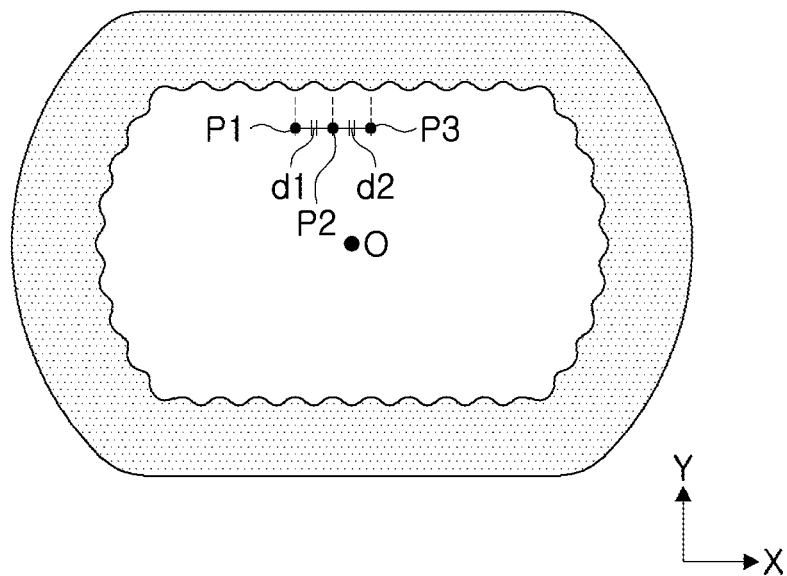
FIG. 3 is a cross-sectional view of a spacer according to a comparison example viewed in an optical axis direction in which a first shape and a second shape are repeated without changing their sizes on an inner surface of the spacer.
Figure 4:
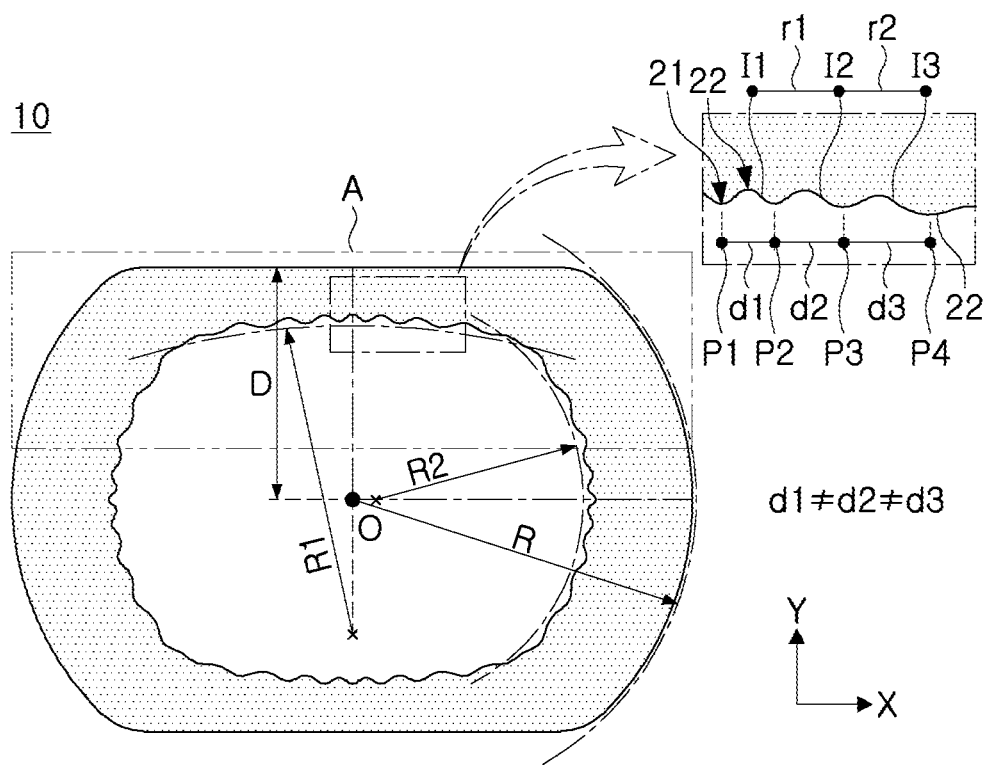
FIG. 4 is a cross-sectional view of the spacer of FIGS. 1 and 2 according to an embodiment in the present disclosure viewed in the optical axis direction.

FIG. 3 is a cross-sectional view of a spacer according to a comparison example viewed in an optical axis direction in which a first shape and a second shape are repeated without changing their sizes on an inner surface of the spacer, and FIG. 4 is a cross-sectional view of the spacer of FIGS. 1 and 2 according to an embodiment in the present disclosure viewed in the optical axis direction.

The spacer 10 according to an embodiment in the present disclosure may have a non-circular shape. As an example, the spacer 10 may have a shape (hereinafter referred to as a D-cut shape) having a cross-section including two curves and two straight lines. Referring to FIG. 4, an outer surface of the spacer 10 may have a form including two flat surfaces opposing each other and two curved surfaces opposing each other. That is, the spacer 10 viewed in the optical axis O direction may include two straight portions opposing each other and two curved portions opposing each other. A distance 2D between the two outer flat surfaces of the spacer 10 viewed in the optical axis O direction may be less than a sum 2R of a radius of curvature of the two outer curved surfaces of the spacer 10 viewed in the optical axis O direction.

The inner surface surrounding a hole formed in the spacer 10 in the optical axis O direction includes a plurality of first shapes 21 and a plurality of second shapes 22. For example, on the inner surface of the spacer 10, the first shapes 21 protruding toward the optical axis O and the second shapes 22 protruding away from the optical axis O may be alternately repeated one by one. For example, each of the first shapes 21 may be a curved surface convex toward the optical axis O, and each of the second shapes 22 may be a curved surface concave toward the optical axis O. In this case, the first shapes 21 and the second shapes 22 may be alternately and repeatedly arranged to form an undulating inner surface of the spacer 10.

Unlike a circular spacer, the D-cut spacer has a linear portion (flat portion) formed on the inner surface of the spacer. In this case, when light passes through the linear portion, diffraction may occur, and thus, a flare phenomenon in the form of a clear line may occur due to the interference of light.

In the case of a circular spacer, since light passes through a curved circular portion, a difference may be made for each propagation point and a flare phenomenon may occur in a blurry form. Therefore, in order to prevent a sharp diffraction by the linear portion of the D-cut spacer, an undulation is applied to the inner surface of the spacer.

FIG. 3 illustrates a comparison example of a spacer in which a plurality of first shapes each having the same shape and a plurality of second shapes each having the same shape are alternately and repeatedly arranged at regular intervals. This is to prevent a flare phenomenon in the form of a clear line caused by the linear portion by replacing the linear portion with an undulating shape as described above. However, when the plurality of first shapes each having the same shape and the plurality of second shapes each having the same shape are alternately and repeatedly arranged, a flare phenomenon of a clear line still occurs due to interference of light passing through the undulating shape of the inner surface of the spacer.

The inner surface of the spacer 10 according to an embodiment in the present disclosure may include a plurality of first shapes 21 and a plurality of second shapes 22 that are alternately and repeatedly arranged. In addition, the plurality of first shapes 21 may have different sizes, and the plurality of second shapes 22 may have different sizes.

For example, a distance d between vertices of two adjacent first shapes 21 is not uniform. For example, the distance d may have at least three different values. Referring to FIG. 4, when vertices of first shapes 21 adjacent to each other are P1, P2, P3, and P4, d1 is a distance between P1 and P2, d2 is a distance between P2 and P3, and d3 is a distance between P3 and P4, $d1 \neq d2 \neq d3$ is satisfied. In this case, the distance between the vertices of the adjacent first shapes 21 may be 0.03 mm or more and 1.0 mm or less.

Referring to FIG. 4, when the vertices of the first shapes 21 of the spacer 10 are connected according to an embodiment in the present disclosure, the inner surface of the spacer 10 may be formed by four arcs. When radii of curvature of two adjacent arcs are referred to as a first radius of curvature R1 and a second radius of curvature R2, R1 and R2 may have different values. As an example, FIG. 4 illustrates a case in which R1 is greater than R2.

Figure 5:
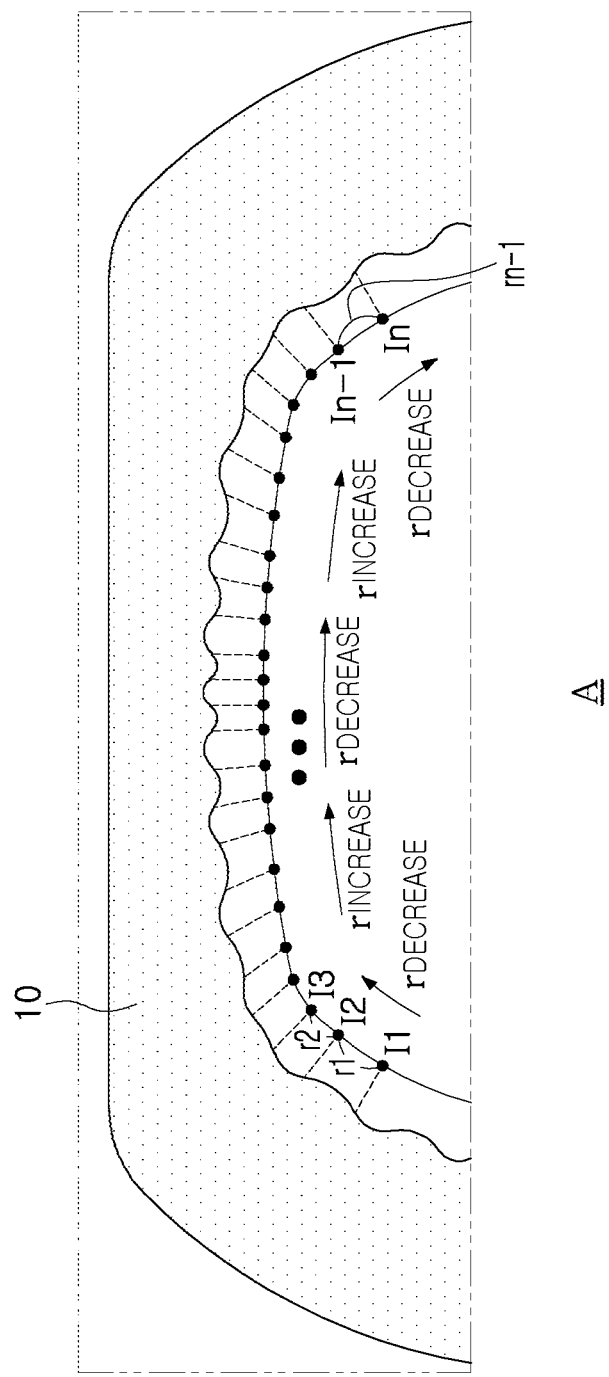
FIG. 5 is an enlarged cross-sectional view of a portion "A" of the spacer of FIG. 4 viewed in the optical axis direction according to an embodiment in the present disclosure.

FIG. 5 is an enlarged cross-sectional view of a portion "A" of the spacer of FIG. 4 according to an embodiment in the present disclosure viewed in the optical axis direction.

Referring to FIGS. 4 and 5, the first shapes 21 of the spacer 10 according to an embodiment in the present disclosure may have a convex curved surface, and the second shapes 22 may have a concave curved surface. In this case, inflection points $I_n$ exist between the first shapes 21 and the second shapes 22. A distance between the inflection points may vary in the circumferential direction. When there are inflection points $I_1, I_2, I_3, \ldots, I_n$, and a distance between $I_{n-1}$ and $I_n$ is $r_n$, the inner surface of the spacer 10 may include at least one first region in which $r_n$ increases in the circumferential direction, and at least one second region in which $r_n$ decreases in the circumferential direction. For example, the at least one first region and the at least one second region may be alternately and repeatedly arranged in the circumferential direction.

Figure 6:
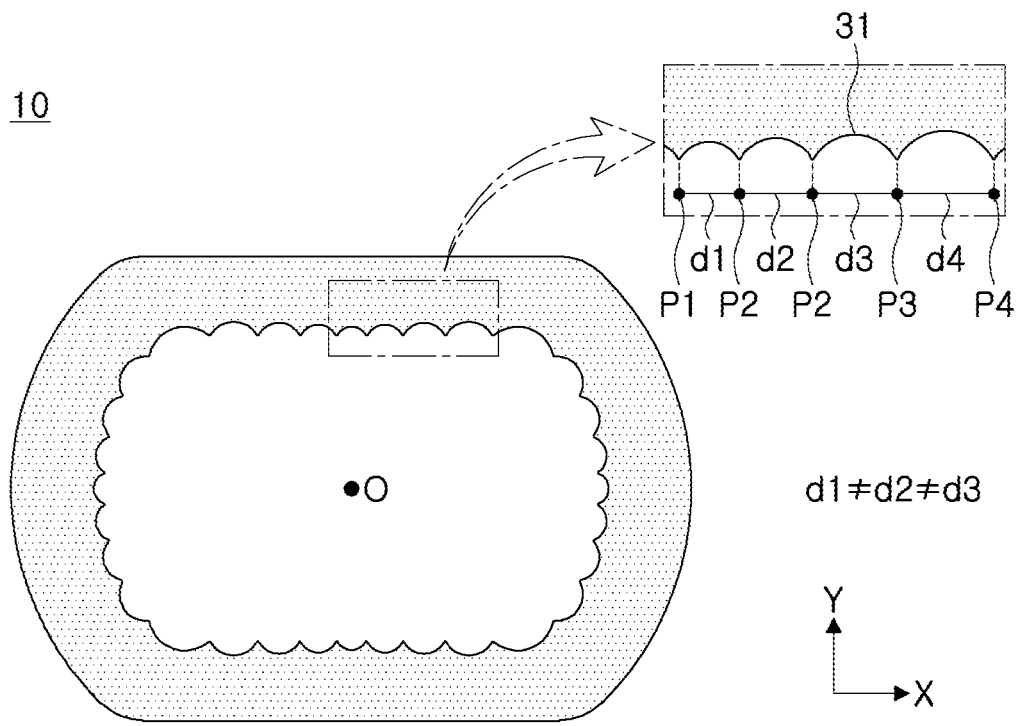
FIG. 6 is a cross-sectional view of a spacer according to another embodiment in the present disclosure.
Figure 7:
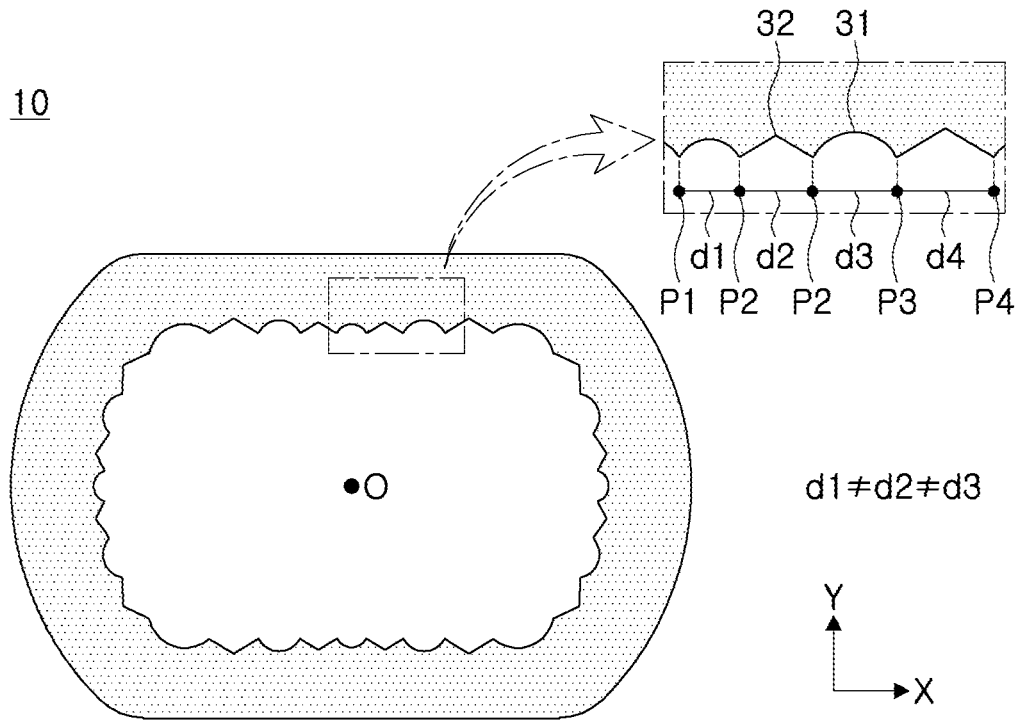
FIG. 7 is a cross-sectional view of a spacer according to another embodiment in the present disclosure.

FIG. 6 is a cross-sectional view of a spacer according to another embodiment in the present disclosure, and FIG. 7 is a cross-sectional view of a spacer according to another embodiment in the present disclosure. Hereinafter, the spacer according to these other embodiments of the present disclosure will be described with reference to FIGS. 6 and 7.

The inner surface of the spacer 10 according to another embodiment in the present disclosure may include a plurality of concave portions protruding away from the optical axis O. The concave portions may include C-shaped concave portions 31 having a curved surface that is concave toward the optical axis. Also, the concave portions may include V-shaped concave portions 32 having a V-shaped surface that is concave toward the optical axis. Referring to FIG. 6, the inner surface of the spacer 10 may include only the C-shaped concave portions 31 having a concave curved surface. Referring to FIG. 7, the inner surface of the spacer 10 may include both the C-shaped concave portions 31 and the V-shaped concave portions 32 alternately and repeatedly arranged with each other.

A distance between adjacent points at which two concave portions of the inner surface of the spacer 10 according to another embodiment in the present disclosure meet is not uniform. For example, it may have at least three different values. Referring to FIGS. 6 and 7, when points at which two concave portions meet are P1, P2, P3, and P4, a distance between P1 and P2 is d1, a distance between P2 and P3 is d2, and a distance between P3 and P4 is d3, $d1 \neq d2 \neq d3$ is satisfied. In this case, the distance between the points at which two adjacent concave portions meet may be 0.03 mm or more and 1.0 mm or less.

As set forth above, the lens assembly according to embodiments in the present disclosure may have an improved image quality by reducing a flare phenomenon.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens assembly comprising:
   a lens barrel;
   a plurality of lenses disposed in the lens barrel and sequentially arranged along an optical axis; and
   a spacer disposed between two adjacent lenses among the plurality of lenses and comprising a hole formed in the spacer in an optical axis direction,
   wherein an inner surface of the spacer surrounding the hole formed in the spacer comprises:
      first shapes protruding toward the optical axis; and
      second shapes protruding away from the optical axis,
   the first shapes and the second shapes alternate with each other one by one in a circumferential direction of the inner surface of the spacer,
   a distance between vertices of two first shapes among the first shapes separated from each other by one second shape among the second shapes varies in the circumferential direction,
   a line connecting the vertices of the first shapes on each of two portions of the inner surface opposing each other is a curve having a first radius of curvature, and a line connecting the vertices of the first shapes on each of two other portions of the inner surface opposing each other is a curve having a second radius of curvature, and
   the first radius of curvature and the second radius of curvature are different from each other.

2. The lens assembly of claim 1, wherein the distance between the vertices of the two first shapes has at least three different values in the circumferential direction.

3. The lens assembly of claim 1, wherein an outer surface of the spacer comprises two flat surfaces opposing each other and two curved surfaces opposing each other.

4. The lens assembly of claim 3, wherein a distance between the two flat surfaces viewed in the optical axis direction is less than a sum of radii of curvature of the two curved surfaces viewed in the optical axis direction.

5. The lens assembly of claim 1, wherein each of the first shapes has a curved surface that is convex toward the optical axis.

6. The lens assembly of claim 1, wherein each of the second shapes has a curved surface that is concave toward the optical axis.

7. The lens assembly of claim 6, wherein each first shape of the first shapes protrudes toward the optical axis from ends of two second shapes disposed on opposite sides of the first shape among the second shapes.

8. The lens assembly of claim 1, wherein the distance between the vertices of the two first shapes is 0.03 mm or more and 1.0 mm or less.

9. The lens assembly of claim 1, wherein the first shapes and the second shapes are connected to each other at inflection points, and
   a distance between adjacent inflection points among the inflection points varies in the circumferential direction.

10. The lens assembly of claim 9, wherein the inner surface of the spacer comprises:
    at least one first region in which the distance between the adjacent inflection points increases in the circumferential direction, and
    at least one second region in which the distance between the adjacent inflection points decreases in the circumferential direction.

11. The lens assembly of claim 10, wherein the at least one first region and the at least one second region alternate with each other one by one in the circumferential direction.

12. A lens assembly comprising:
    a lens barrel;
    a plurality of lenses disposed in the lens barrel and sequentially arranged along an optical axis, each lens of the plurality of lenses having a first width in a first direction intersecting the optical axis and a second width in a second direction intersecting the optical axis and perpendicular to the first direction, the second width being different from the first width; and
    a spacer disposed between two adjacent lenses among the plurality of lenses and comprising a hole formed in the spacer in an optical axis direction,
    wherein an inner surface of the spacer surrounding the hole formed in the spacer comprises a plurality of concave portions connected to each other and protruding away from the optical axis,
    a line connecting points at which the concave portions are connected to each other comprises two first portions having a first radius of curvature, and two second portions having a second radius of curvature different from the first radius of curvature, and
    the two first portions having the first radius of curvature face each other in the first direction, and the two second portions having the second radius of curvature face each other in the second direction.

13. The lens assembly of claim 12, wherein each of the plurality of concave portions has a curved surface that is concave toward the optical axis.

14. The lens assembly of claim 12, wherein the plurality of concave portions comprise V-shaped portions and C-shaped portions alternately arranged with each other one by one.

15. The lens assembly of claim 12, wherein the spacer is opaque.

* * * * *